United States Patent
Abbasfar

(10) Patent No.: US 8,510,490 B2
(45) Date of Patent: Aug. 13, 2013

(54) ENCODING DATA USING COMBINED DATA MASK AND DATA BUS INVERSION

(75) Inventor: Aliazam Abbasfar, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 114 days.

(21) Appl. No.: 13/378,939

(22) PCT Filed: Jun. 14, 2010

(86) PCT No.: PCT/US2010/038556
§ 371 (c)(1),
(2), (4) Date: Dec. 16, 2011

(87) PCT Pub. No.: WO2011/008394
PCT Pub. Date: Jan. 20, 2011

(65) Prior Publication Data
US 2012/0131244 A1    May 24, 2012

Related U.S. Application Data

(60) Provisional application No. 61/225,102, filed on Jul. 13, 2009.

(51) Int. Cl.
  *G06F 13/00* (2006.01)
  *H03M 7/00* (2006.01)
(52) U.S. Cl.
  USPC .................. 710/105; 341/50; 341/55
(58) Field of Classification Search
  USPC ........... 710/100, 105, 106; 711/154; 341/50, 341/55
  See application file for complete search history.

(56) References Cited

U.S. PATENT DOCUMENTS

| | | | |
|---|---|---|---|
| 6,898,648 B2 | 5/2005 | LaBerge | |
| 7,139,852 B2 | 11/2006 | LaBerge | |
| 7,495,587 B2 | 2/2009 | Bae | |
| 7,519,892 B1 | 4/2009 | Newcomb et al. | |
| 7,519,893 B2 | 4/2009 | Newcomb et al. | |
| 7,574,647 B1 | 8/2009 | Newcomb et al. | |
| 2002/0156953 A1 | 10/2002 | Beiley et al. | |
| 2003/0158981 A1 | 8/2003 | LaBerge | |
| 2005/0182894 A1 | 8/2005 | LaBerge | |
| 2007/0217312 A1 | 9/2007 | Newcomb et al. | |
| 2007/0242508 A1 | 10/2007 | Bae | |
| 2009/0141564 A1 | 6/2009 | Pax | |
| 2013/0128994 A1* | 5/2013 | Hollis | 375/259 |

OTHER PUBLICATIONS

PCT International Search Report and Written Opinion, PCT/US2010/038556, Dec. 29, 2010, 8 Pages.

(Continued)

*Primary Examiner* — Glenn A Auve
(74) *Attorney, Agent, or Firm* — Fenwick & West LLP

(57) ABSTRACT

A data encoding scheme for transmission of data from one circuit to another circuit combines DBI encoding and non-DBI encoding and uses a data mask signal to indicate the type of encoding used. The data mask signal in a first state indicates that the data transmitted from one circuit to said another circuit is to be ignored, and the data mask signal in a second state indicates that the data transmitted from one circuit to said another circuit is not to be ignored. If the data mask signal is in the second state, a first subset of the data is encoded with data bus inversion and a second subset of the data is encoded differently from data bus inversion. Such encoding has the advantage that SSO noise is dramatically reduced when the encoded data is transmitted from one circuit to another circuit.

23 Claims, 7 Drawing Sheets

(56) References Cited

OTHER PUBLICATIONS

Bae, Seung-Jun, et al., "An 80nm 4 Gb/s/pin 32 bit 512 Mb GDDR4 Graphics DRAM with Low Power and Low Noise Data Bus Inversion", IEEE Journal of Solid-State Circuits, vol. 43, No., Jan. 2008. 11 Pages.

Invitation to Correct Defects in the International Application with mail date of Jun. 18, 2010 re Int'l Application No. PCT/US2010/038556. 4 Pages.

EP Office Communication dated Feb. 23, 2012 re EP Application No. 10800221.3. 2 pages.

* cited by examiner

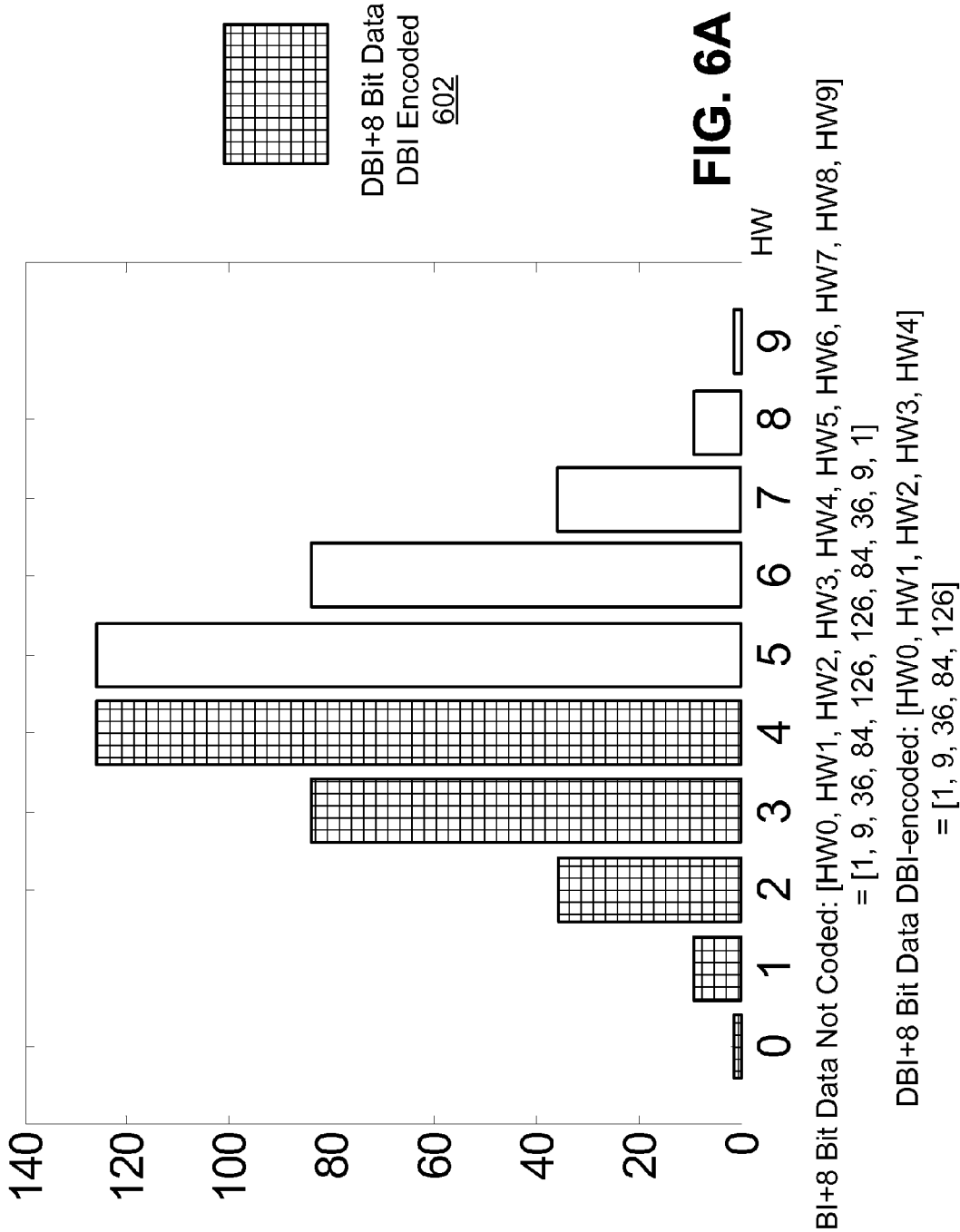

ENCODING DATA USING COMBINED DATA MASK AND DATA BUS INVERSION

BACKGROUND

The present disclosure relates to encoding data for transfer on a chip to chip communication link.

Integrated circuit devices communicate with one another using input/output (I/O) circuits that are configured to transmit and receive multi-bit data over a plurality of signal lines. When multiple output drivers on the circuits change state at the same time at a high speed to transmit the multi-bit data, the changing current drawn from a power supply by the output drivers induces a voltage that results in power supply disturbance, commonly referred to as simultaneous switching output ("SSO") noise (or simultaneous switching noise ("SSN")). SSN can cause undesired transient behavior among the output drivers, input receivers or internal logic on the circuits.

BRIEF DESCRIPTION OF THE DRAWINGS

FIG. 6A illustrates Hamming Weights (HWs) present in 9 bit data including 8 bit uncoded data and a DBI bit.

DETAILED DESCRIPTION OF EMBODIMENTS

Techniques used for reducing SSN on parallel links include data bus inversion (DBI), also referred to as dynamic bus inversion. DBI inverts some of the multi-bit data to be transferred based on the previous bits transmitted over the parallel communication link, for example, to reduce SSN by decreasing the number of transmitter switching transitions that occur across the link.

A data mask (dm) signal is used by one circuit to indicate to another circuit that the data sent by the one circuit should be disregarded by the other circuit. For example, the data mask signal may be used by a memory controller to indicate to a memory device that the data transmitted by the memory controller to the memory device should be ignored. The data mask signal can be a voltage level on a pin of the memory controller integrated circuit or part of a command transmitted between the memory controller and the memory device.

Embodiments of the present disclosure include a data encoding scheme for transmission of data from one circuit to another circuit that combines DBI encoding and non-DBI encoding and uses a data mask signal to indicate the type of encoding used. Here, the term "non-DBI encoding" is used to refer to any encoding scheme that is different from DBI. The data mask signal in a first state indicates that the data transmitted from one circuit to said another circuit is to be ignored, and the data mask signal in a second state indicates that the data transmitted from one circuit to said another circuit is not to be ignored. If the data mask signal is in the second state, a first subset of the data is encoded with data bus inversion and a second subset of the data is encoded differently from data bus inversion. The encoding scheme according to the embodiments described herein has the advantage that SSO noise can be dramatically reduced when the encoded data is transmitted from one circuit to another circuit.

Reference will now be made to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1:
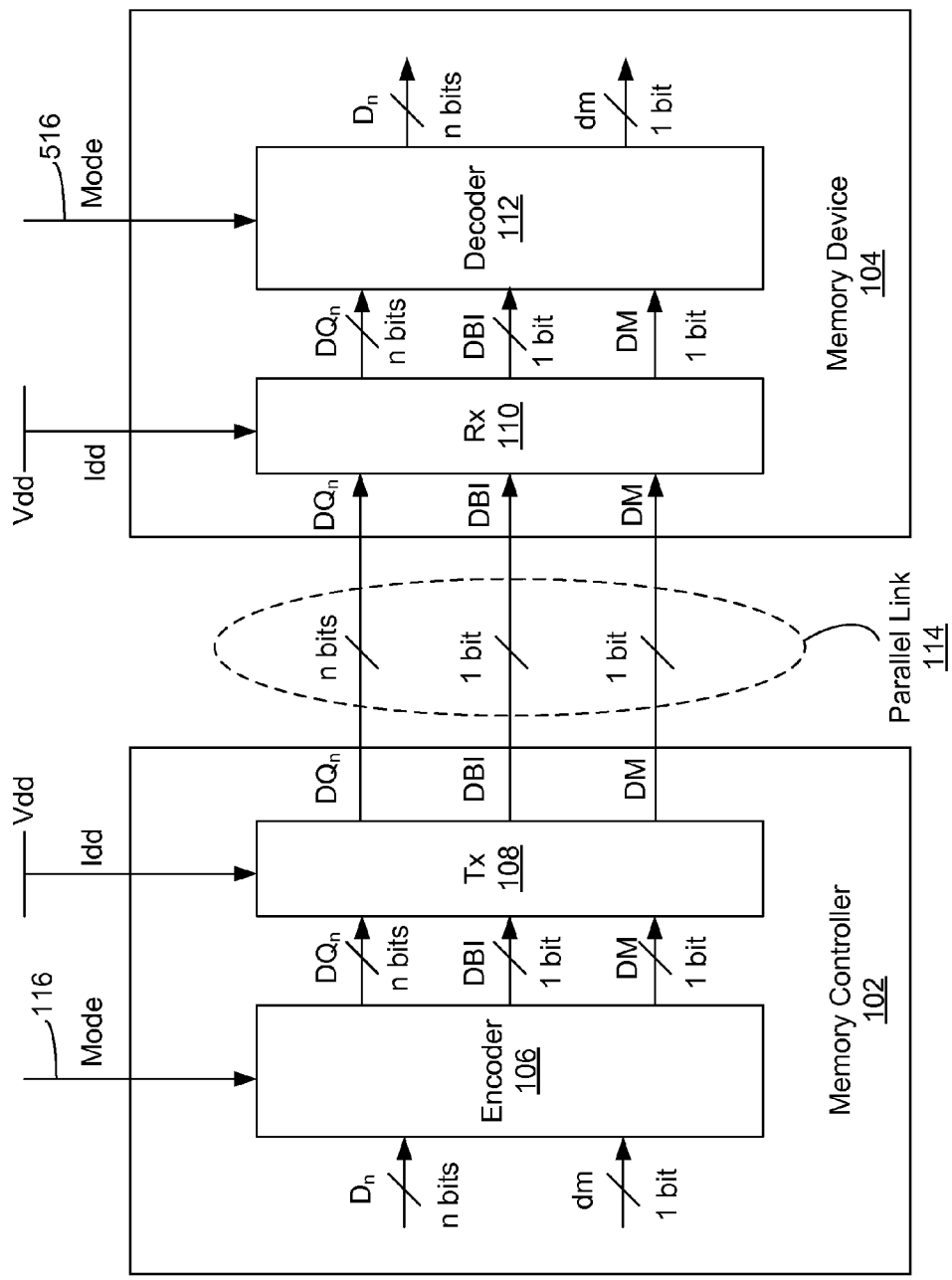
FIG. 1 illustrates a system including an encoder and decoder capable of coding and decoding data, according to one embodiment.

FIG. 1 illustrates a system including an encoder and decoder capable of coding and decoding data, according to one embodiment. The system of FIG. 1 includes two circuits communicating with each other on a parallel communication link 114. For example, circuit 102 may be a memory controller, and circuit 104 may be a memory device such as a DRAM or SRAM. However, circuits 102, 104 may be other types of circuits communicating data between each other.

The parallel communication link 114 may be a bus on a circuit board on which the circuits 102, 104 reside, and has a data width (n+2 bits) larger than the number of bits (n bits) of data $D_n$ to be transmitted from memory controller 102 to memory device 104. Here, n is a positive integer greater than one (n>1). The n-bit data $D_n$ have varying Hamming Weights (HWs) depending upon the number of logic level "1"s in the n-bit data $D_n$. Here, Hamming Weight refers to the number of non-zero (i.e., logic level "1") bits in the n-bit data $D_n$. Although the link 114 is shown herein as a single-ended parallel communication link, note that link 114 can also be a link configured to transmit differential signals or multi-wire signals.

Memory controller 102 includes an encoder 106 and a transmitter (Tx) 108. Data $D_n$ can be provided to encoder 106 as, for example, serial or parallel data. Memory device 104 also includes decoder 112 and a receiver (Rx) 110. In addition, memory device 104 may also include another encoder and a transmitter for transmitting encoded data to memory controller 102, and memory controller 102 may also include a receiver and a decoder for receiving and decoding the encoded data received from memory device 104. However, the encoder and transmitter of memory device 104 and the receiver and decoder of memory controller 102 are not shown in FIG. 1 as they are not necessary for explaining the embodiments of the present disclosure.

Encoder 106 receives the n-bit data $D_n$ and a 1-bit data mask signal (dm) from other circuits (not shown) or other circuit components (e.g., state machines, not shown) within memory controller 102. As explained above, the data mask signal (dm) is used for memory controller 102 to indicate to memory device 104 to ignore the data received from memory controller 102 (i.e., to indicate no-write operation). The dm signal can be a voltage level on a pin, which is offset or accompanies data being sent from the memory controller 102 to the memory device. Alternatively, masking information conveyed by the dm signal may be included as part of a command transmitted between the memory controller 102 and the memory device 104, and thus no physical data mask signal dm need be present on the parallel link 114. Encoder 106 includes combinatorial logic gates or look-up tables (LUTs) that are configured to perform encoding of the n-bit data $D_n$ it receives to convert the n-bit data to n-bit encoded data $DQ_n$ and a DBI bit (1-bit). Encoder 106 also converts the data mask (dm) signal to a modified data mask (DM) signal. As will be explained in more detail below with reference to FIGS. 2 and 3, encoder 106 uses DBI encoding in some instances of the n-bit data $D_n$ and non-DBI encoding in other instances of the n-bit data $D_n$ to encode the n-bit data $D_n$, depending upon the Hamming Weights of the n-bit data $D_n$. Encoder 106 also generates the modified data mask signal (DM) to indicate to memory device 104 the type of encoding used in the n-bit encoded data $DQ_n$ in those different instances.

In addition, encoder 106 also receives a mode signal 116. In one embodiment, when mode signal 116 is asserted (e.g., logic high), encoder 106 encodes the n-bit data $D_n$ using the encoding scheme according to the embodiments of the present disclosure as described herein. When mode signal 116 is not asserted (e.g., logic low), encoder 106 uses DBI encoding (that is independent of the use of masking information) to encode the n-bit data $D_n$.

In an embodiment, transmitter (Tx) 108 transmits the encoded data $DQ_n$, DBI bit, and the DM bit over the parallel link 114 to the receiver (Rx) 110 of memory device 104. In doing so, transmitter (Tx) 108 draws supply current Idd from a power supply (not shown) providing the supply voltage (Vdd), consuming power from the power supply and generating SSO noise. However, the SSO noise generated by transmitter (Tx) 108 can be reduced according to the embodiments of the present disclosure.

In an embodiment, receiver 110 receives the encoded data $DQ_n$, DBI bit, and the DM bit over the parallel link 114 from memory controller 102. In doing so, receiver 110 also draws supply current Idd from a power supply (not shown) providing the supply voltage (Vdd), consuming power from the power supply and generating SSO noise. Again, the SSO noise generated by receiver (Rx) 110 can be reduced according to the embodiments of the present disclosure.

Receiver 110 provides the received encoded data $DQ_n$, DBI bit, and the DM bit to decoder 112. Decoder 112 decodes the encoded data $DQ_n$ and DBI bit back to n-bit data $D_n$ and converts the modified data mask signal (DM) back to the data mask signal (dm), as will be explained in more detail below with reference to FIGS. 4 and 5.

In addition, decoder 112 also receives a mode signal 516. In one embodiment, when mode signal 516 is asserted (e.g., logic high), decoder 112 decodes the n-bit encoded data $DQ_n$ using the decoding scheme according to the embodiments of the present disclosure as described herein. When mode signal 516 is not asserted (i.e., logic low), decoder logic 112 uses DBI decoding (that is independent of the use of masking information) to decode the n-bit encoded data $DQ_n$.

Figure 2:
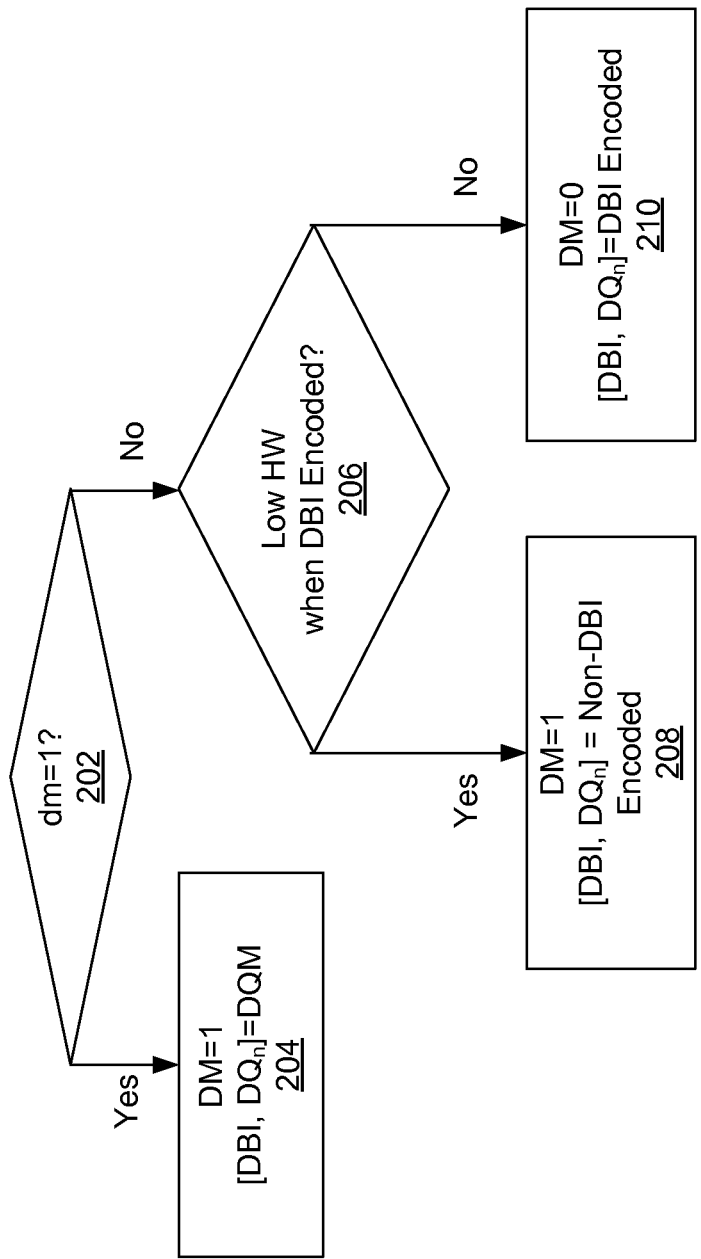
FIG. 2 is a flow chart illustrating a method of encoding data, according to one embodiment.

FIG. 2 is a flow chart illustrating a method of encoding data, according to one embodiment. According to the encoding scheme of the embodiment of FIG. 2, a combination of DBI encoding and non-DBI encoding is used to encode the n-bit data $D_n$ depending upon the Hamming Weight of the n-bit data $D_n$, i.e., the number of non-zero (i.e., logic level "1") bits in the n-bit data $D_n$.

First, it is determined 202 whether the data mask signal (dm) is asserted (in this example "1" or logic high). If the data mask signal (dm) is asserted, the n-bit data $D_n$ is encoded such that the n+1 bit encoded data [DBI, $DQ_n$] is a predetermined (n+1)-bit data pattern (DQM) indicative of a mask signal to memory device 104. Also, the modified data mask signal (DM) is set to "1" or logic high. On the other hand, if the data mask signal (dm) is not asserted ("0" or logic low), then it is further determined 206 whether the n-bit data $D_n$, when DBI encoded, has a Hamming Weight lower than a predetermined threshold. In other words, in step 206 it is further determined whether the uncoded n-bit data $D_n$ has a Hamming Weight lower than a first predetermined threshold or higher than a second predetermined threshold. For example, when $D_n$ is 8-bit data, a threshold of Hamming Weight 3 may be used such that the 8-bit data $D_n$ is considered low Hamming Weight data if the 8-bit data $D_n$, when DBI encoded, has Hamming Weight lower than 4 (i.e., HW of DBI-encoded $D_n$ is 0, 1, 2, or 3), i.e., when the uncoded 8-bit data $D_n$ has Hamming Weight lower than 4 (i.e., HW of uncoded $D_n$ is 0, 1, 2, or 3) or higher than 5 (i.e., HW of uncoded $D_n$ is 6, 7, or 8).

If the DBI-encoded n-bit data $D_n$ is not low Hamming Weight data in step 206, then the n-bit data $D_n$ is encoded such that the n+1 bit encoded data [DBI, $DQ_n$] is DBI encoded. For example, when n-bit data $D_n$ is 8-bit data and has Hamming Weight of 4, no inversion of the data bits occurs and the DBI bit is not asserted (i.e., logic low). On the other hand, if the 8-bit data $D_n$ has Hamming Weight of 5, inversion of the data bits occurs and the DBI bit is asserted (i.e., logic high). Thus, for 8-bit input data $D_n$, the n+1 bit encoded data [DBI, $DQ_n$] with DBI encoding in step 210 will have Hamming Weight of only 4. Also, the modified data mask signal (DM) is not asserted ("0" or logic low) in step 210.

On the other hand, if the n-bit DBI-encoded data $D_n$ is low Hamming Weight data in step 206, then the n-bit data $D_n$ is encoded using a non-DBI encoding scheme. In some embodiments, all or most of the n+1 bit encoded data [DBI, $DQ_n$] is encoded to be non-low Hamming Weight Data. For example, when n-bit data $D_n$ is 8-bit data, the 8-bit data $D_n$ is encoded with a non-DBI encoding scheme that results in most (252) of the 9 bit encoded data [DBI, $DQ_n$] having Hamming Weights of four and merely some (4) of the 9 bit encoded data [DBI, $DQ_n$] having Hamming Weights of three. Also, the modified data mask signal (DM) is asserted ("1" or logic high) even when the original data mask signal (dm) is not asserted to indicate to memory device 104 that a non-DBI encoding scheme was used to encode the n+1 bit encoded data [DBI, $DQ_n$]. Thus, the modified data mask signal (DM) is used to indicate to the memory device 104 whether DBI encoding or non-DBI encoding was used to encode the n+1 bit encoded data [DBI, $DQ_n$]. The encoding scheme of the embodiment of FIG. 2 significantly reduces SSO noise because the Hamming Weights of the encoded data [DBI, $DQ_n$] are limited to a small range of variations (for example, Hamming Weights of 3 or 4 in the example of 8 bit data $D_n$).

Table 1 below illustrates an example of combinatorial logic that may be used to encode 8-bit input data $D_n$, to 9-bit encoded data [DBI, $DQ_n$] according to the embodiment as shown in FIG. 2. The combinatorial logic shown in Table 1 is merely exemplary, and other combinatorial logic may be used to perform the encoding as illustrated in FIG. 2.

TABLE 1

| HW of 8-bit data $D_n$ | 8 Bit Uncoded Data $D_n$ ($x = x_7 x_6 x_5 x_4 x_3 x_2 x_1 x_0$) | 9-Bit Encoded Data [DBI, $DQ_n$] ($\bar{x}$ is complement of x) | Notes and Logic ("+" is OR operation) | HW of Coded Data [DBI, $DQ_n$] |
|---|---|---|---|---|
| 0 | 0000 0000 | 1 0101 0000 | | 3 |
| 1 | $x_7 x_6 x_5 x_4$ 0000 | 0 1000 $\bar{x}_7 \bar{x}_6 \bar{x}_5 \bar{x}_4$ | | 4 |
| | 0000 $x_3 x_2 x_1 x_0$ | 0 0100 $\bar{x}_3 \bar{x}_2 \bar{x}_1 \bar{x}_0$ | | 4 |
| 2 | 00 $x_5 x_4 x_3 x_2 x_1 x_0$ | 0 11 $x_5 x_4 x_3 x_2 x_1 x_0$ | $y_3 = x_5 + x_2 + x_0$ | 4 |
| | 01 $x_5 x_4 x_3 x_2 x_1 x_0$ | 0 1010 $y_3 y_2 y_1 y_0$ | $y_2 = x_5 + x_4 + x_1$ | 4 |
| | 10 $x_5 x_4 x_3 x_2 x_1 x_0$ | 0 1001 $y_3 y_2 y_1 y_0$ | $y_1 = x_4 + x_3 + x_0$ | 4 |
| | 11 $x_5 x_4 x_3 x_2 x_1 x_0$ | 0 1001 0001 | $y_0 = x_3 + x_2 + x_1$ | 3 |

TABLE 1-continued

| HW of 8-bit data $D_n$ | 8 Bit Uncoded Data $D_n$ ($x = x_7 x_6 x_5 x_4 x_3 x_2 x_1 x_0$) | 9-Bit Encoded Data [DBI, $DQ_n$] ($\bar{x}$ is complement of x) | Notes and Logic ("+" is OR operation) | HW of Coded Data [DBI, $DQ_n$] |
|---|---|---|---|---|
| 3 | $x_7 x_6 x_5 x_4 x_3 x_2 x_1 x_0$ | 1 $x_7 x_6 x_5 x_4 x_3 x_2 x_1 x_0$ | | 4 |
| 4 | $x_7 x_6 x_5 x_4 x_3 x_2 x_1 x_0$ | 0 $x_7 x_6 x_5 x_4 x_3 x_2 x_1 x_0$ | DBI (no inversion) | 4 |
| 5 | $x_7 x_6 x_5 x_4 x_3 x_2 x_1 x_0$ | 1 $\bar{x}_7 \bar{x}_6 \bar{x}_5 \bar{x}_4 \bar{x}_3 \bar{x}_2 \bar{x}_1 \bar{x}_0$ | DBI (inversion) | 4 |
| 6 | 11 $x_5 x_4 x_3 x_2 x_1 x_0$ | 0 00 $x_5 x_4 x_3 x_2 x_1 x_0$ | $z_3 = \bar{x}_5 + \bar{x}_2 + \bar{x}_0$ | 4 |
|  | 10 $x_5 x_4 x_3 x_2 x_1 x_0$ | 0 0101 $z_3 z_2 z_1 z_0$ | $z_2 = \bar{x}_5 + \bar{x}_4 + \bar{x}_1$ | 4 |
|  | 01 $x_5 x_4 x_3 x_2 x_1 x_0$ | 0 0110 $z_3 z_2 z_1 z_0$ | $z_1 = \bar{x}_4 + \bar{x}_3 + \bar{x}_0$ | 4 |
|  | 00 $x_5 x_4 x_3 x_2 x_1 x_0$ | 0 0110 0001 | $z_0 = \bar{x}_3 + \bar{x}_2 + \bar{x}_1$ | 3 |
| 7 | $x_7 x_6 x_5 x_4$ 1111 | 0 0111 $\bar{x}_7 \bar{x}_6 \bar{x}_5 \bar{x}_4$ | | 4 |
|  | 1111 $x_3 x_2 x_1 x_0$ | 0 1011 $\bar{x}_3 \bar{x}_2 \bar{x}_1 \bar{x}_0$ | | 4 |
| 8 | 1111 1111 | 1 1010 0000 | | 3 |
|  | Data Mask (dm) = 1 | DQM = 1 1100 0000 | | 3 |

As can be seen from Table 1 above, when the data mask signal (dm) is asserted, the encoded data [DBI, $DQ_n$] is DQM (111000000). On the other hand, when the data mask signal (dm) is not asserted, then data $D_n$ with Hamming Weights of 4 or 5 are encoded using DBI such that the data bits of data $D_n$ with Hamming Weight of 4 are not inverted and the DBI bit is set to 0 while the data bits of data $D_n$ with Hamming Weight of 5 are inverted and the DBI bit is set to 1. The DBI-encoded data [DBI, $DQ_n$] has Hamming Weight of 4 only. Also, when the data mask signal (dm) is not asserted, then data $D_n$ with Hamming Weights of 0, 1, 2, or 3 (lower than 4) or 6, 7, or 8 (higher than 5) are encoded using a non-DBI encoding scheme as shown above in Table 1 that limits the Hamming Weights of the encoded data [DBI, $DQ_n$] to Hamming Weights of 3 or 4.

More specifically, as shown in Table 1, 8-bit data pattern in the form of 00000000 with HW of zero is encoded to the 9-bit encoded data pattern 101010000 with HW of three. 8-bit data in the form of $x_7 x_6 x_5 x_4$ 0000 with HW of one are encoded into 9-bit data in the form of 01000 $\bar{x}_7 \bar{x}_6 \bar{x}_5 \bar{x}_4$ with HW of four, and 8-bit data patterns in the form of 0000 $x_3 x_2 x_1 x_0$ with HW of one are encoded to 9-bit encoded data patterns in the form of 00100 $\bar{x}_3 \bar{x}_2 \bar{x}_1 \bar{x}_0$ with HW of four, where $x_n$ is the n-th bit from a least significant bit of the 8-bit data pattern and $\bar{x}_n$ is the complement of $x_n$. 8-bit data patterns in the form of 00 $x_5 x_4 x_3 x_2 x_1 x_0$ with HW of two are encoded to 9-bit encoded data patterns in the form of 011 $\bar{x}_5 \bar{x}_4 \bar{x}_3 \bar{x}_2 \bar{x}_1 \bar{x}_0$ with HW of four, 8-bit data patterns in the form of 01 $x_5 x_4 x_3 x_2 x_1 x_0$ with HW of two are encoded to 9-bit encoded data patterns in the form of 01010 $y_3 y_2 y_1 y_0$ with HW of four, 8-bit data patterns in the form of 10 $x_5 x_4 x_3 x_2 x_1 x_0$ with HW of two are encoded to 9-bit encoded data patterns in the form of 01001 $y_3 y_2 y_1 y_0$ with HW of four, and 8-bit data patterns in the form of 11 $x_5 x_4 x_3 x_2 x_1 x_0$ with HW of two are encoded to 9-bit encoded data pattern 010010001 with HW of three, where $x_n$ is the n-th bit from a least significant bit of the 8-bit data pattern, $y_3 = \bar{x}_5 + \bar{x}_2 + \bar{x}_0$, $y_2 = \bar{x}_5 + \bar{x}_4 + \bar{x}_1$, $y_1 = \bar{x}_4 + \bar{x}_3 + \bar{x}_0$, and $y_0 = \bar{x}_3 + \bar{x}_2 + \bar{x}_1$ and where + is OR operation.

For another example, 8-bit data patterns in the form of $x_7 x_6 x_5 x_4 x_3 x_2 x_1 x_0$ with HW of three are encoded to 9-bit encoded data patterns in the form of 1 $x_7 x_6 x_5 x_4 x_3 x_2 x_1 x_0$ with HW of four, where $x_n$ is the n-th bit from a least significant bit of the 8-bit data pattern. 8-bit data patterns in the form of $x_7 x_6 x_5 x_4 x_3 x_2 x_1 x_0$ with HW of four are DBI-encoded to 9-bit encoded data patterns 0 $x_7 x_6 x_5 x_4 x_3 x_2 x_1 x_0$ with HW of four, where $x_n$ is the n-th bit from a least significant bit of the 8-bit data pattern. 8-bit data patterns in the form of $x_7 x_6 x_5 x_4 x_3 x_2 x_1 x_0$ with HW of five are also DBI-encoded to the 9-bit encoded data patterns in the form of 1 $\bar{x}_7 \bar{x}_6 \bar{x}_5 \bar{x}_4 \bar{x}_3 \bar{x}_2 \bar{x}_1 \bar{x}_0$ with HW of four, where $x_n$ is the n-th bit from a least significant bit of the 8-bit data pattern and $\bar{x}_n$ is the complement (inverse) of x.

For still another example, 8-bit data patterns in the form of 11 $x_5 x_4 x_3 x_2 x_1 x_0$ with HW of six are encoded to 9-bit encoded data patterns in the form of 000 $x_5 x_4 x_3 x_2 x_1 x_0$ with HW of four, 8-bit data patterns in the form of 10 $x_5 x_4 x_3 x_2 x_1 x_0$ with HW of six are encoded to 9-bit encoded data patterns 00101 $z_3 z_2 z_1 z_0$ with HW of four, 8-bit data patterns in the form of 01 $x_5 x_4 x_3 x_2 x_1 x_0$ with HW of six are encoded to 9-bit encoded data patterns 00110 $z_3 z_2 z_1 z_0$ with HW of four, and 8-bit data patterns in the form of 00 $x_5 x_4 x_3 x_2 x_1 x_0$ with HW of six are encoded to 9-bit encoded data patterns 001100001 with HW of three, where $x_n$ is the n-th bit from a least significant bit of the 8-bit data pattern, $z_3 = \bar{x}_5 + \bar{x}_2 + \bar{x}_0$, $z_2 = \bar{x}_5 + \bar{x}_4 + \bar{x}_1$, $z_1 = \bar{x}_4 + \bar{x}_3 + \bar{x}_0$, and $z_0 = \bar{x}_3 + \bar{x}_2 + \bar{x}_1$, $\bar{x}_n$ is complement of $x_n$, and "+" is OR operation. 8-bit data patterns in the form of $x_7 x_6 x_5 x_4$ 1111 with HW of seven are encoded to 9-bit encoded data patterns in the form of 00111 $\bar{x}_7 \bar{x}_6 \bar{x}_5 \bar{x}_4$ with HW of four, and 8-bit data patterns in the form of 1111 $x_3 x_2 x_1 x_0$ with HW of seven are encoded to 9-bit encoded data patterns in the form of 01011 $\bar{x}_3 \bar{x}_2 \bar{x}_1 \bar{x}_0$ with HW of four, where $x_n$ is n-th bit from a least significant bit of the 8-bit data pattern and $\bar{x}_n$ is complement of $x_n$. For still another example, 8-bit data pattern 11111111 with HW of eight is encoded to 9-bit encoded data pattern 110100000 with HW of three. Also, the DQM data pattern is set to be 111000000.

Although the n-bit data $D_n$ to be transmitted from memory controller 102 to memory device 104 is assumed to be 8-bit data in the examples above, the use of 8-bit data herein is merely exemplary. Thus, the encoding scheme described herein may be used with any number of bits of data to be transmitted from memory controller 102 to memory device 104. Mappings between 8-bit uncoded data and 9-bit coded data such as those shown in Table 1 above may be predetermined and stored in a LUT (not shown) on a memory controller 102. That way, encoding of data according the embodiments described herein may be performed rapidly.

Figure 3:
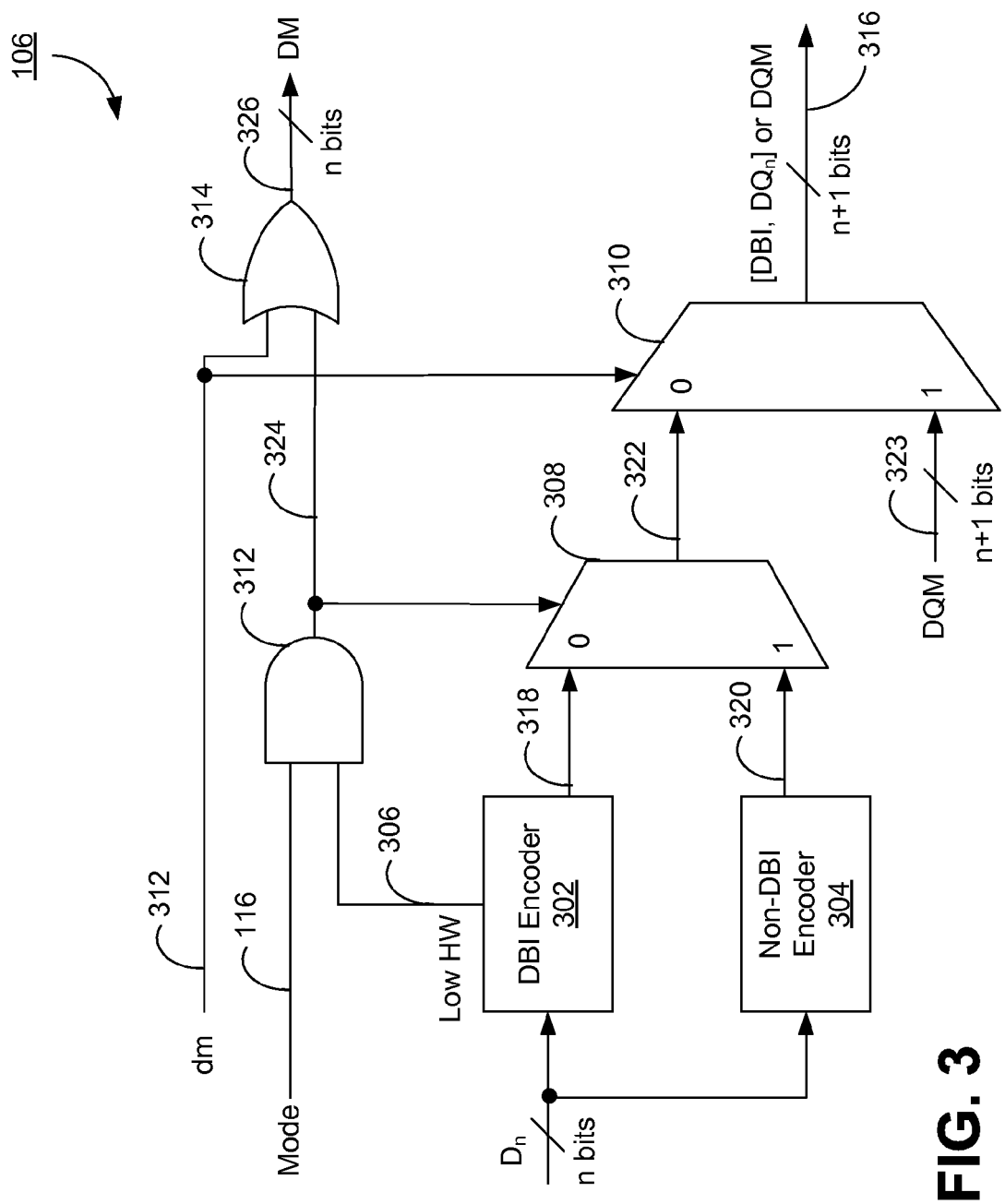
FIG. 3 illustrates one example of an encoder circuit, according to one embodiment.

FIG. 3 illustrates one example of an encoder circuit, according to one embodiment. The encoder circuit of FIG. 3 is one example of a circuit configured to perform the encoding scheme as described above with reference to FIG. 2, although different circuit configurations may be available with the same functions to perform the encoding scheme of FIG. 2. The encoder 106 includes a DBI encoder 302, a non-DBI encoder 304, an AND gate 312, an OR gate 314, and multiplexers 308, 310. DBI encoder 302 is configured to conduct DBI encoding on the input data $D_n$ as explained above with step 210 of FIG. 2 and non-DBI encoder 304 is configured to conduct non-DBI encoding on the input data $D_n$ as explained above with step 208 of FIG. 2, for example as shown above in Table 1. Mode signal 116 is used to indicate to encoder 116 whether the encoding scheme according to the embodiments herein (FIG. 2) should be used (when mode 116 is asserted) or DBI encoding (that is independent of the use of masking information) should be used (when mode 116 is not asserted). For purposes of illustration herein of the encoding scheme of FIG. 2, mode signal 116 will be assumed asserted (logic high).

Turning to the operation of the encoder circuit 106, when data mask signal (dm) 312 is asserted ("1" or logic high), the modified data mask signal DM 326 output from OR gate 314 is also "1" or logic high. In addition, data mask signal (dm) 312 also causes multiplexer 310 to select the predetermined bit pattern DQM 323 as its output 316.

On the other hand, if the data mask signal (dm) 312 is not asserted ("0" or logic low), the multiplexer 310 selects the output 322 of multiplexer 308 as its encoded data [DBI, $DQ_n$]. The output 322 of multiplexer 308 is either the output 318 of DBI encoder 302 or the output 320 of non-DBI encoder 304, selected according to the output 324 of AND gate 312. In this regard, DBI encoder 302 includes logic (not shown) configured to determine whether the input data $D_n$, when DBI-encoded by DBI encoder 302, has a Hamming Weight lower than a predetermined threshold. In other words, DBI encoder 302 is also configured to determine whether the uncoded n-bit data $D_n$ has a Hamming Weight lower than a first predetermined threshold or higher than a second predetermined threshold. When the input data $D_n$, when DBI-encoded by DBI encoder 302, has a Hamming Weight lower than a predetermined threshold, DBI encoder 302 generates the low HW signal 306 to be logic high ("1"), but otherwise generates the low HW signal 306 to be logic low ("0").

Since mode signal 116 is set to be logic high, the output 324 of AND gate 312 becomes logic high if the input data $D_n$, when DBI-encoded by DBI encoder 302, has a Hamming Weight lower than a predetermined threshold and thus the low HW signal 306 is asserted. As a result, multiplexer 308 selects the output 320 of non-DBI encoder 304 as its output 322. In addition, the output 326 of OR gate 314 also becomes logic high (modified data mask signal DM=1) even through the original data mask signal dm 312 is not asserted. Thus, the modified data mask signal DM 326 at logic high can indicate to the memory device 104 that a non-DBI encoding has been used to encode the input data $D_n$.

On the other hand, the output 324 of AND gate 312 becomes logic low if the input data $D_n$, when DBI-encoded by DBI encoder 302, has a Hamming Weight not lower than a predetermined threshold and thus the low HW signal 306 is not asserted. As a result, multiplexer 308 selects the output 318 of DBI encoder 302 as its output 322. In addition, the output 326 of OR gate 314 also becomes logic low (modified data mask signal DM=0) when the original data mask signal (dm) 312 is not asserted. Thus, the modified data mask signal DM 326 at logic low can indicate to the memory device 104 that DBI encoding has been used to encode the input data $D_n$.

Finally, when mode signal 116 is at logic low ("0"), then the output 324 of AND gate 312 is always at logic low regardless of the low HW signal 306. Thus, the modified data mask signal (DM) 326 output from OR gate 314 follows the original data mask signal (dm) 312, and multiplexer 308 always selects the output 318 of DBI encoder 302. Thus, when the original data mask signal (dm) 312 is not asserted, multiplexer 310 selects the output 322 of multiplexer 308, which is always the output 318 of DBI encoder, resulting in DBI encoding regardless of the Hamming Weight of the input data $D_n$. When the original data mask signal (dm) 312 is asserted, multiplexer 310 selects the DQM signal to indicate a mask signal to the memory device 104. Thus, when mode signal 116 is at logic low, the encoder 106 performs DBI encoding (that is independent of the use of masking information), and thus the encoder 106 is completely backward compatible with conventional DBI encoding schemes. For example, mode signal 116 may stored as a value in a programmable configuration register or hard wired by means of a fuse or metal mask, etc.

Figure 4:
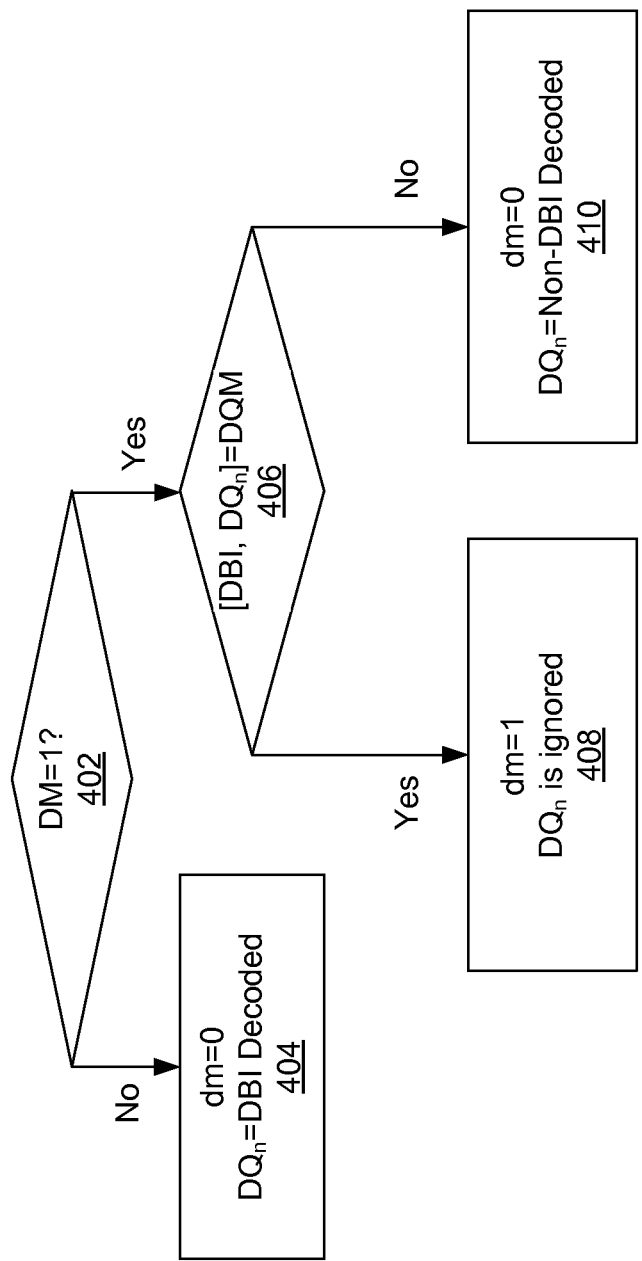
FIG. 4 is a flow chart illustrating a method of decoding data, according to one embodiment.

FIG. 4 is a flow chart illustrating a method of decoding data, according to one embodiment. The decoding scheme of the embodiment of FIG. 4 is used to decode the data [DBI, $DQ_n$] encoded using a combination of DBI encoding and non-DBI encoding according to the encoding scheme as explained above with reference to FIG. 2.

First, it is determined 402 whether the modified data mask signal (DM) is asserted ("1" or logic high). If the modified data mask signal (DM) is not asserted, that means the data [DBI, $DQ_n$] was DBI-encoded (step 210 of FIG. 2). Thus, data [DBI, $DQ_n$] is decoded using DBI and the data mask signal (dm) is set to "0" to indicate that the decoded data $D_n$ should not be ignored. On the other hand, if the modified data mask (DM) signal is not asserted, then it is further determined 406 whether the encoded data [DBI, $DQ_n$] matches the predetermined data pattern DQM.

If the encoded data [DBI, $DQ_n$] matches the predetermined data pattern DQM, that means the original data mask signal (dm) was asserted (step 204 of FIG. 2). Thus, the data mask signal (dm) is set to "1" to indicate that the encoded data $DQ_n$ should be ignored and $DQ_n$ is disregarded by memory device 104. On the other hand, if the encoded data [DBI, $DQ_n$] does not match the predetermined data pattern DQM, then that means the data [DBI, $DQ_n$] was encoded using non-DBI encoding (step 208 of FIG. 2). Thus, the data [DBI, $DQ_n$] is decoded using non-DBI decoding and the data mask signal (dm) is set to "0."

Note that decoding of the data [DBI, $DQ_n$] can be performed simply by reversing the combinatorial logic used to encode the data $DQ_n$. For example, when 8-bit data $DQ_n$ is encoded to 9-bit data [DBI, $DQ_n$] using combinatorial logic shown in Table 1, the 9-bit data [DBI, $DQ_n$] can be decoded to recover the 8-bit data $DQ_n$ simply by reversing the combinatorial logic shown in Table 1. For example, 9-bit data in the form of $01000\overline{x}_7\,\overline{x}_6\,\overline{x}_5\,\overline{x}_4$ with HW of four can be decoded into 8 bit data $x_7\,x_6\,x_5\,x_4\,0000$ with HW of one. Numerous other examples of reversing the combinatorial logic for decoding are apparent from Table 1. In some embodiments, such reverse mappings of logic may also be predetermined and stored in a LUT.

Figure 5:
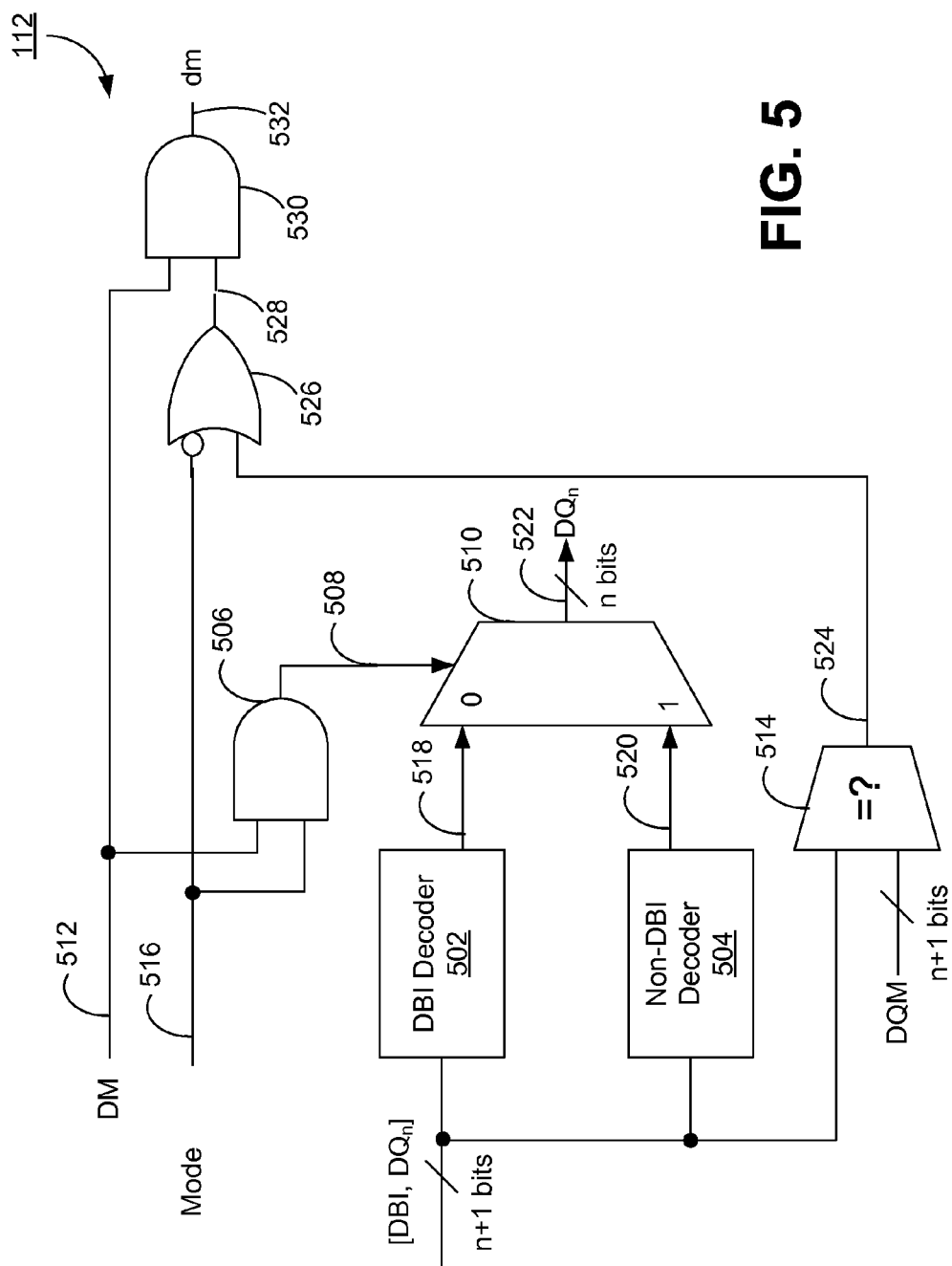
FIG. 5 illustrates one example of a decoder circuit, according to one embodiment.

FIG. 5 illustrates one example of a decoder circuit, according to one embodiment. The decoder circuit of FIG. 5 is one example of a circuit configured to perform the decoding scheme as described above with reference to FIG. 4, although different circuit configurations may be available with the same functions to perform the decoding scheme of FIG. 4. The decoder 112 includes a DBI decoder 502, a non-DBI decoder 504, AND gates 506, 530, an OR gate 526, a comparator 514, and a multiplexer 510. DBI decoder 502 is configured to conduct DBI decoding on the encoded data [DBI, $DQ_n$] as explained above with step 404 of FIG. 5 and non-DBI encoder 504 is configured to conduct non-DBI decoding on the encoded data [DBI, $DQ_n$] as explained above with step 410 of FIG. 4. Mode signal 516 is used to indicate to decoder 112 whether the decoding scheme according to the embodiments herein (FIG. 4) should be used (when mode signal 516 is asserted) or DBI decoding (that is independent of the use of masking information) should be used (when mode signal 516 is not asserted). For purposes of illustration herein of the decoding scheme of FIG. 4, mode signal 516 will be assumed asserted (logic high).

Turning to the operation of the decoder circuit 112, when the modified data mask signal (DM) 512 is not asserted ("0" or logic low), that means that the data [DBI, $DQ_n$] was DBI-encoded (step 210 of FIG. 2). Thus, the data mask signal (dm) 532 output from AND gate 530 is set at logic low ("0"). In addition, the output 508 of AND gate 506 is also at logic low, thereby causing multiplexer 510 to select the output 518 of DBI decoder 502 as its output $DQ_n$ 522. Thus, the data [DBI, $DQ_n$] is decoded using DBI (step 404 of FIG. 4).

When the modified data mask signal (DM) 512 is asserted ("1" or logic high), the output data mask signal (dm) 532 of AND gate 530 is at logic high if the output 524 of comparator 512 is at logic high, i.e., when the encoded data [DBI, $DQ_n$] matches the predetermined data pattern DQM as in step 406 of FIG. 4. When data mask signal (dm) 532 is at logic high, the encoded data is disregarded (step 408 of FIG. 4).

On the other hand, if the output 524 of comparator 512 is at logic low (i.e., when the encoded data [DBI, $DQ_n$] does not match the predetermined data pattern DQM), the output 528 of OR gate 528 is also at logic low ("0") and thus the data mask signal (dm) 532 output from AND gate 530 is also set at logic low. In addition, the output 508 of AND gate 506 is also at logic high, thereby causing multiplexer 510 to select the output 520 of non-DBI decoder 504 as its output $DQ_n$ 522. Thus, the data [DBI, $DQ_n$] is decoded using non-DBI decoding (step 410 of FIG. 4).

Finally, when mode signal 516 is at logic low ("0"), then the output 508 of AND gate 506 is also always at logic low regardless of the state of the modified data mask signal (DM) 512, thereby causing multiplexer 510 to always select the output 518 of DBI decoder 502 as its output $DQ_n$ 522. In addition, the output 528 of OR gate 526 is always at logic high if mode signal 516 is at logic low, and thus the data mask signal (dm) 532 output from AND gate 530 follows the state of the modified data mask signal (DM) 512. Thus, the data [DBI, $DQ_n$] is always decoded using DBI decoding when mode signal 516 is not asserted. In other words, when mode signal 516 is at logic low, the decoder 112 performs DBI decoding (that is independent of the use of masking information), and thus the decoder 112 is completely backward compatible with conventional DBI decoding schemes. For example, mode signal 516 may stored as a value in a programmable configuration register or hard wired by means of a fuse or metal mask, etc.

Figure 6B:
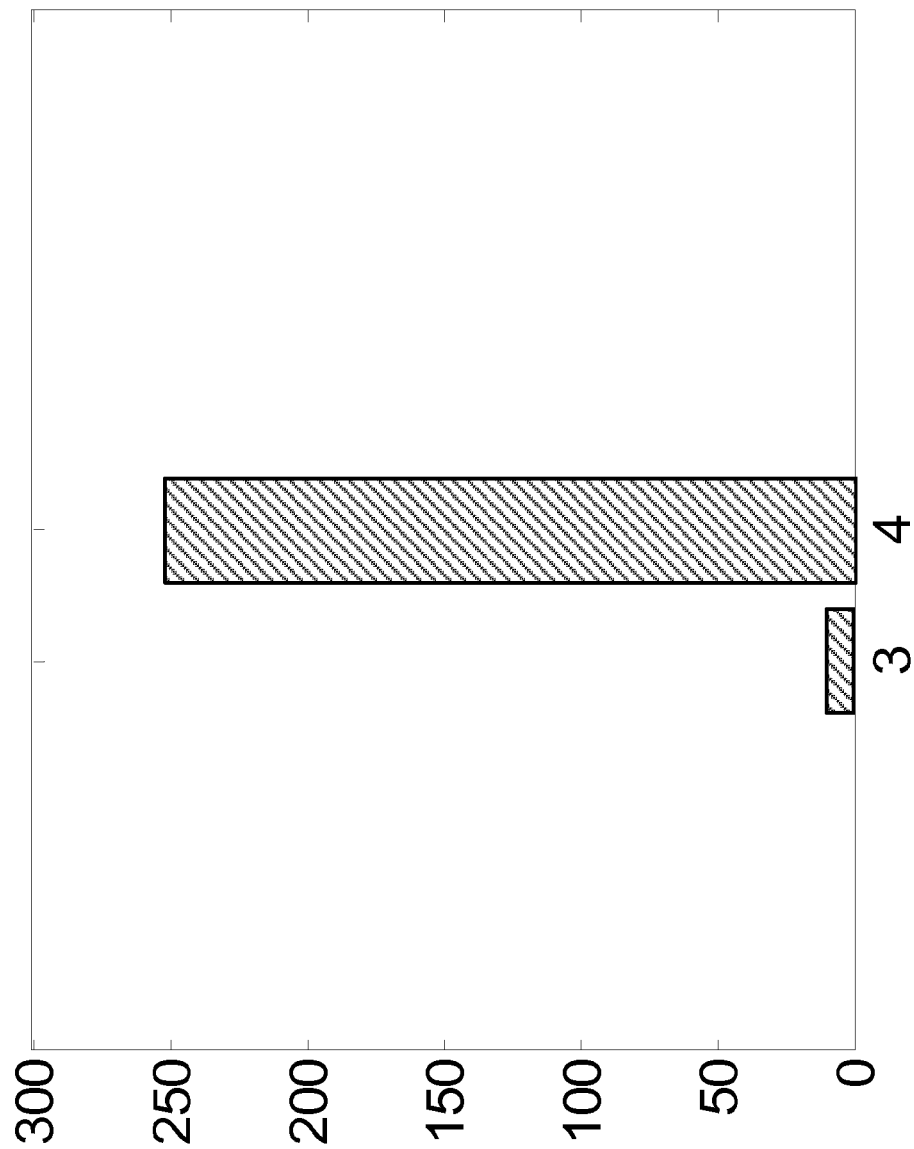
FIG. 6B illustrates Hamming Weights present in 9 bit coded data including a DBI bit and 8 bit coded data encoded according to one embodiment.

With the encoding technique in accordance with the embodiments described herein, SSN can be reduced significantly and AC current drawn from the power supply may also be reduced significantly compared to conventional encoding methods such as DBI. This is explained in more detail with reference to FIGS. 6A and 6B. FIG. 6A illustrates Hamming Weights (HWs) present in 9 bit data including 8 bit uncoded data and a DBI bit, and FIG. 6B illustrates Hamming Weights present in 9 bit coded data including a DBI bit and 8 bit coded data encoded according to one embodiment.

Referring to FIG. 6A, the HW histogram illustrates the distribution of HWs in the 9-bit data including DBI (1 bit) and 8 bit uncoded data, and the HW histograms 602 when such uncoded 9 bit data is encoded using conventional DBI ([DBI+8 bit DBI-encoded data]). Among the possible data patterns ($2^9$) of the 9-bit parallel uncoded data, there is 1 data pattern with HW=0, 9 data patterns with HW=1, 36 data patterns with HW=2, 84 data patterns with HW=3, 126 data patterns with HW=4, 126 data patterns with HW=5, 84 data patterns with HW=6, 36 data patterns with HW=7, 9 data pattern with HW=8, and 1 data pattern with HW=9. The maximum possible variation in the HWs in the 9-bit uncoded data pattern is thus 9 (between HW=0 and HW=9), which results in significant SSN if transmitted uncoded.

Still referring to FIG. 6A, the HW histograms 602 illustrates that only Hamming Weights 0 to 4 would be present when such 8 bit data is encoded using DBI ([DBI+8 bit DBI-encoded data]), since data with Hamming Weights 5 through 8 would be inverted. Among the possible data patterns ($2^8$) of the 9-bit parallel coded data, there is 1 data pattern with HW=0, 9 data patterns with HW=1, 36 data patterns with HW=2, 84 data patterns with HW=3 and 128 data patterns with HW=4. The maximum possible variation in the HWs in the 9-bit DBI-encoded data pattern is thus 4 (between HW=0 and HW=4), which results in reduced SSN compared to when the data is transmitted uncoded.

Referring to FIG. 6B, the HW histogram 652 illustrates the distribution of HWs in the 9-bit data ([DBI+8 bit encoded data]) including encoded according to the combined data mask and DBI encoding scheme as described above with reference to FIG. 2. Among the possible data patterns ($2^8$) of the 9-bit parallel coded data, there are 5 data patterns with HW=3 (including the DQM pattern) and 252 data patterns with HW=4. The maximum possible variation in the HWs in the 9-bit data pattern is thus only 1 (between HW=3 and HW=4), which results in significant reduction of SSN compared to the SSN when the data is transmitted uncoded or conventional DBI-coded.

These advantages are shown more specifically in Table 2 below, which shows the current (Idd) that would be drawn by transmitter (Tx) 108 (FIG. 1) when the data $D_n$ is transmitted uncoded, conventional DBI-coded, and coded with combined DM/DBI according to the embodiments herein, referencing the supply current Idd to be drawn when data $D_n$ is transmitted uncoded as the reference (100%).

TABLE 2

| Idd | Uncoded | Conventional DBI | Combined DM/DBI Coded |
|---|---|---|---|
| Idd, DC-peak (%) | 100% | 50% | 50% |
| Idd, DC-average (%) | 100% | 40% | 45% |
| Idd, AC peak-peak (%) | 100% | 50% | 25% |
| Idd, AC rms (%) | 100% | 61% | 13% |

As shown in Table 2 above, the average DC supply current Idd increases slightly (from 40% to 45%) when the combined DM/DBI encoding scheme described herein is used, compared to conventional DBI encoding. This is because a large number of encoded data patterns are concentrated at high Hamming Weight (HW=4), thereby increasing the average DC current Idd drawn from the power supply (not shown). On the other hand, the AC supply current drawn from the power supply is reduced dramatically, from 50% to 25% for AC peak-to-peak supply current Idd and from 61% to 13% for AC rms (root-mean-square) values, when the combined DM/DBI encoding scheme according to the embodiments described herein is used, compared to conventional DBI encoding. Thus, SSO noise can be dramatically reduced when using the combined DM/DBI encoding scheme according to the embodiments described herein.

Upon reading this disclosure, those of ordinary skill in the art will appreciate still additional alternative structural and functional designs for encoding data to reduce SSO noise, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A circuit, comprising:
   an encoder configured to receive data and a data mask signal and to generate encoded data, the data mask signal in a first state indicating that the data transmitted from the circuit to another circuit is to be ignored and the data mask signal in a second state indicating that the data transmitted from the circuit to said another circuit is not to be ignored, the encoder configured to encode a first subset of the data with data bus inversion and a second subset of the data differently from data bus inversion to generate the encoded data responsive to the data mask signal being in the second state; and
   a transmitter configured to transmit the encoded data over a communication link.

2. The circuit of claim 1, wherein the encoder is further configured to generate a predetermined bit pattern, responsive to the data mask signal being in the first state.

3. The circuit of claim 2, wherein the encoder is further configured to generate a modified data mask signal, the modified data mask signal being in the first state responsive to the data mask signal being in the first state or the encoder encoding the second subset of the data differently from data bus inversion.

4. The circuit of claim 3, wherein the modified data mask signal is in the second state, responsive to the data mask signal being in the second state and the encoder encoding the first subset of the data with data bus inversion.

5. The circuit of claim 4, wherein the transmitter is further configured to transmit the modified data mask signal together with the encoded data.

6. The circuit of claim 1, wherein the second subset of the data has Hamming Weight lower than a first predetermined threshold or higher than a second predetermined threshold, the second predetermined threshold being higher than the first predetermined threshold.

7. The circuit of claim 1, wherein the received data has 8 bits, and the encoded data has 9 bits with Hamming Weight limited to 3 or 4.

8. A circuit, comprising:
   a receiver configured to receive encoded data and a modified data mask signal from another circuit over a communication link; and
   a decoder configured to decode the encoded data and the modified data mask signal to generate data and a data mask signal, the data mask signal in a first state indicating that the data transmitted from said another circuit to the circuit is to be ignored and the data mask signal in a second state indicating the data transmitted from said another circuit to the circuit is not to be ignored,
   the decoder configured to decode a first subset of the encoded data with data bus inversion to generate the data responsive to the modified data mask signal being in the second state, and
   the decoder configured to decode a second subset of the encoded data differently from data bus inversion to generate the data responsive to the modified data mask signal being in the first state.

9. The circuit of claim 8, wherein the decoder is further configured to generate the data mask signal to be in the first state, responsive to the modified data mask signal being in the first state and the encoded data corresponding to a predetermined bit pattern.

10. The circuit of claim 9, wherein the decoder is configured to decode the second subset of the encoded data differently from data bus inversion to generate the data, responsive to the modified data mask signal being in the first state and the encoded data not corresponding to the predetermined bit pattern.

11. The circuit of claim 8, wherein the encoded data has 9 bits with Hamming Weight limited to 3 or 4, and the data has 8 bits.

12. In a first circuit, a method of transmitting data to a second circuit, the method comprising:
   receiving data and a data mask signal, the data mask signal in a first state indicating that the data transmitted from the first circuit to the second circuit is to be ignored and the data mask signal in a second state indicating that the data transmitted from the first circuit to the second circuit is not to be ignored;
   responsive to the data mask signal being in the second state, encoding a first subset of the data with data bus inversion and a second subset of the data differently from data bus inversion to generate encoded data; and
   transmitting the encoded data to the second circuit over a communication link.

13. The method of claim 12, further comprising:
   generating a predetermined bit pattern responsive to the data mask signal being in the first state; and
   transmitting the predetermined bit pattern to the second circuit over the communication link.

14. The method of claim 13, further comprising:
   generating a modified data mask signal, the modified data mask signal being in the first state responsive to the data mask signal being in the first state or the second subset of the data being encoded differently from data bus inversion.

15. The method of claim 14, wherein the modified data mask signal is generated to be in the second state responsive to the data mask signal being in the second state and the first subset of the data being encoded with data bus inversion.

16. The method of claim 15, further comprising transmitting the modified data mask signal together with the encoded data to the second circuit over the communication link.

17. The method of claim 12, wherein the second subset of the data has Hamming Weight lower than a first predetermined threshold or higher than a second predetermined threshold, the second predetermined threshold being higher than the first predetermined threshold.

18. The method of claim 12, wherein the received data has 8 bits, and the encoded data has 9 bits with Hamming Weight limited to 3 or 4.

19. In a first circuit, a method of receiving data from a second circuit, the method comprising:
   receiving encoded data and a modified data mask signal from the second circuit over a communication link; and
   decoding the encoded data and the modified data mask signal to generate data and a data mask signal, the data mask signal in a first state indicating that the data transmitted from the second circuit to the first circuit is to be ignored and the data mask signal in a second state indicating that the data transmitted from the second circuit to the first circuit is not to be ignored, a first subset of the encoded data being decoded with data bus inversion to generate the data responsive to the modified data mask signal being in the second state, and a second subset of the encoded data being decoded differently from data bus inversion to generate the data responsive to the modified data mask signal being in the first state.

20. The method of claim 19, further comprising generating the data mask signal to be in the first state responsive to the modified data mask signal being in the first state and the encoded data corresponding to a predetermined bit pattern.

21. The method of claim 20, wherein the second subset of the encoded data is decoded differently from data bus inversion to generate the data, responsive to the modified data mask signal being in the first state and the encoded data not corresponding to the predetermined bit pattern.

22. The method of claim 19, wherein the encoded data has 9 bits with Hamming Weight limited to 3 or 4, and the data has 8 bits.

23. A system comprising:
a first circuit including:
an encoder configured to receive data and a data mask signal and to generate encoded data, the data mask signal in a first state indicating that the data transmitted from the first circuit to a second circuit is to be ignored and the data mask signal in a second state indicating that the data transmitted from the first circuit to the second circuit is not to be ignored, the encoder configured to encode a first subset of the data with data bus inversion and a second subset of the data differently from data bus inversion to generate the encoded data responsive to the data mask signal being in the second state;
a second circuit configured to receive the encoded data and a modified data mask signal from the first circuit and decode the encoded data and the modified data mask signal to generate the data and the data mask signal; and
a communication link coupled between the first circuit and the second circuit and configured to transmit the encoded data and the modified data mask signal from the first circuit to the second circuit.

* * * * *